United States Patent
Nagano et al.

(10) Patent No.: US 10,270,109 B2
(45) Date of Patent: Apr. 23, 2019

(54) FUEL CELL SYSTEM

(71) Applicant: TOYOTA JIDOSHA KABUSHIKI KAISHA, Toyota-shi, Aichi-ken (JP)

(72) Inventors: Shuji Nagano, Toyota (JP); Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 14/933,395

(22) Filed: Nov. 5, 2015

(65) Prior Publication Data
US 2016/0141657 A1 May 19, 2016

(30) Foreign Application Priority Data
Nov. 14, 2014 (JP) ................................. 2014-232034

(51) Int. Cl.
*H01M 8/04* (2016.01)
*H01M 8/04119* (2016.01)

(52) U.S. Cl.
CPC .... *H01M 8/04156* (2013.01); *H01M 2250/20* (2013.01); *Y02T 90/32* (2013.01)

(58) Field of Classification Search
CPC ................................................ H01M 8/04156
See application file for complete search history.

(56) References Cited

U.S. PATENT DOCUMENTS

| | | |
|---|---|---|
| 8,795,911 B2 | 8/2014 | Taniguchi et al. |
| 2006/0113131 A1 | 6/2006 | Kato et al. |
| 2013/0017470 A1 | 1/2013 | Hotta et al. |

FOREIGN PATENT DOCUMENTS

| | | | | |
|---|---|---|---|---|
| JP | 2002-362164 | | 12/2002 | |
| JP | 2005-158339 | * | 6/2005 | ............ H01M 8/24 |
| JP | 2005-158339 A | | 6/2005 | |
| JP | 2006-221854 | * | 8/2006 | ............ H01M 8/24 |
| JP | 2006-221854 A | | 8/2006 | |
| JP | 2006-221855 | | 8/2006 | |
| JP | 2009-289426 | | 12/2009 | |
| JP | 2011-079347 | * | 4/2011 | ............ H01M 8/04 |
| JP | 2013-004352 A | | 1/2013 | |

* cited by examiner

*Primary Examiner* — Osei K Amponsah
(74) *Attorney, Agent, or Firm* — Finnegan, Henderson, Farabow, Garrett & Dunner, LLP

(57) ABSTRACT

A fuel cell system includes a fuel cell for causing electrochemical reactions of anode gas and cathode gas, a fuel cell system case accommodating the fuel cell, and a frame disposed below the fuel cell system case and fixing the fuel cell system case. A rib is provided on an upper surface of the frame. A water reservoir portion is provided in the bottom of the fuel cell system case so that the water reservoir portion is a concave in an inner side of the fuel cell system case and is a convex in the outside of the fuel cell system case. The water reservoir portion is located at a position at which at least a part of the convex vertically overlaps with the rib.

2 Claims, 4 Drawing Sheets

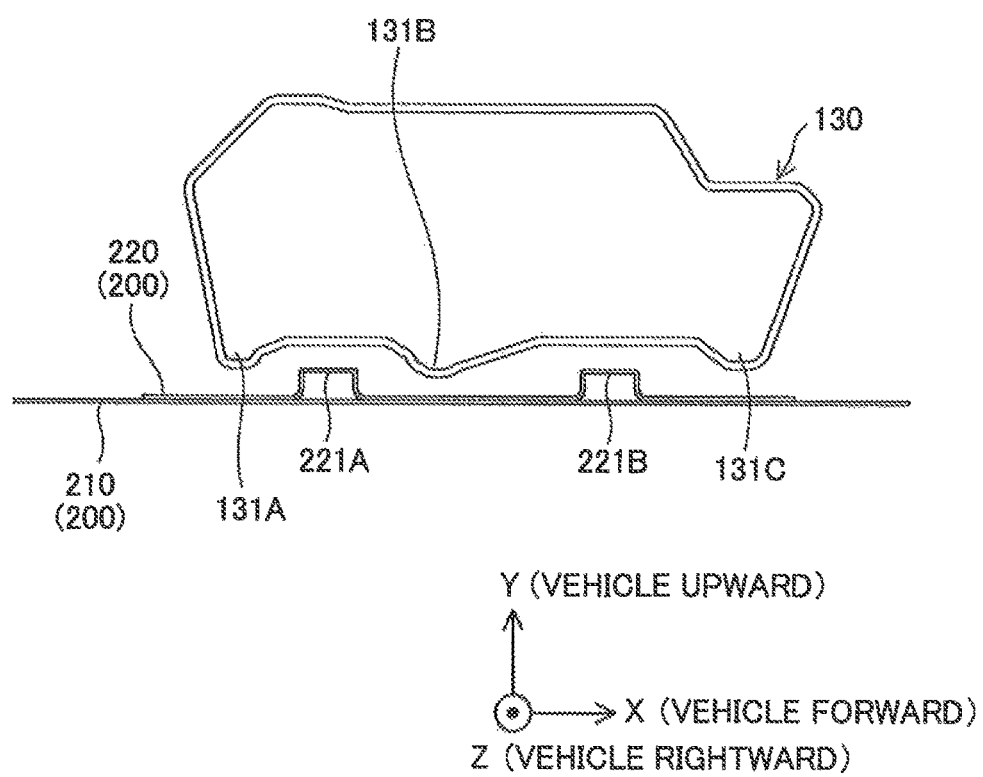

FUEL CELL SYSTEM

CROSS-REFERENCE TO RELATED APPLICATION

This application claims priority to Japanese Patent Application No. 2014-232034, filed on Nov. 14, 2014, the contents of all of which are incorporated herein by reference in their entirety.

BACKGROUND

Field

The present invention relates to a fuel cell system.

Related Art

Water is produced by electrochemical reactions when a fuel cell generates power. JP2009-289426A etc. discloses an art in which, since such water may leak from the fuel cell, a recessed portion (water reservoir portion) for accommodating the produced water is formed in a part of an inner bottom of a case where the fuel cell is accommodated.

However, when the recessed portion is formed in the part of the inner bottom of the case for accommodating the fuel cell, the fuel cell system including the case entirely increases in a vertical size.

SUMMARY

The present invention is made in order to address at least a part of the subject described above, and can he implemented in terms of the following aspects.

(1) According to one aspect of the invention, a fuel cell system is provided, which includes a fuel cell for causing electrochemical reactions of anode gas and cathode gas, a fuel cell system case accommodating the fuel cell, and a frame disposed below the fuel cell system case and fixing the fuel cell system case. A rib is provided on an upper surface of the frame. A water reservoir portion is provided in the bottom of the fuel cell system. case so that the water reservoir portion is a concave in an inner side of the fuel cell system case and is a convex in the outside of the fuel cell system case. The water reservoir portion is located at a position at which at least a part of the convex vertically overlaps with the rib. According to this aspect, water can be reserved in the water reservoir portion, without increasing the height of the fuel cell system.

(2) The fuel cell system of the aspect described above may further include a plurality of auxiliary machineries used for operation of the fuel cell. The fuel cell system case may include an auxiliary machinery case where the plurality of auxiliary machineries are accommodated. The water reservoir portion may be provided in the bottom of the auxiliary machinery case. According to this aspect, the water reservoir portion can be formed in the auxiliary machinery case, without increasing the height of the fuel cell system.

(3) In the fuel cell system of the aspect described above, the water reservoir portion may include a plurality of water reservoir portions. According to this aspect, water which exists inside the fuel cell system case can be dividedly reserved in the plurality of water reservoir portions.

The present invention can be implemented in various forms, such as a method of manufacturing the fuel cell system, a computer program for implementing the manufacturing method, and a recording medium that records the computer program.

BRIEF DESCRIPTION OF DRAWINGS

FIG. 4 is a cross-sectional view illustrating the auxiliary machinery case of the fuel cell system taken along a line A-A of FIG. 3.

DESCRIPTION OF EMBODIMENTS

A. Embodiment

Figure 1:
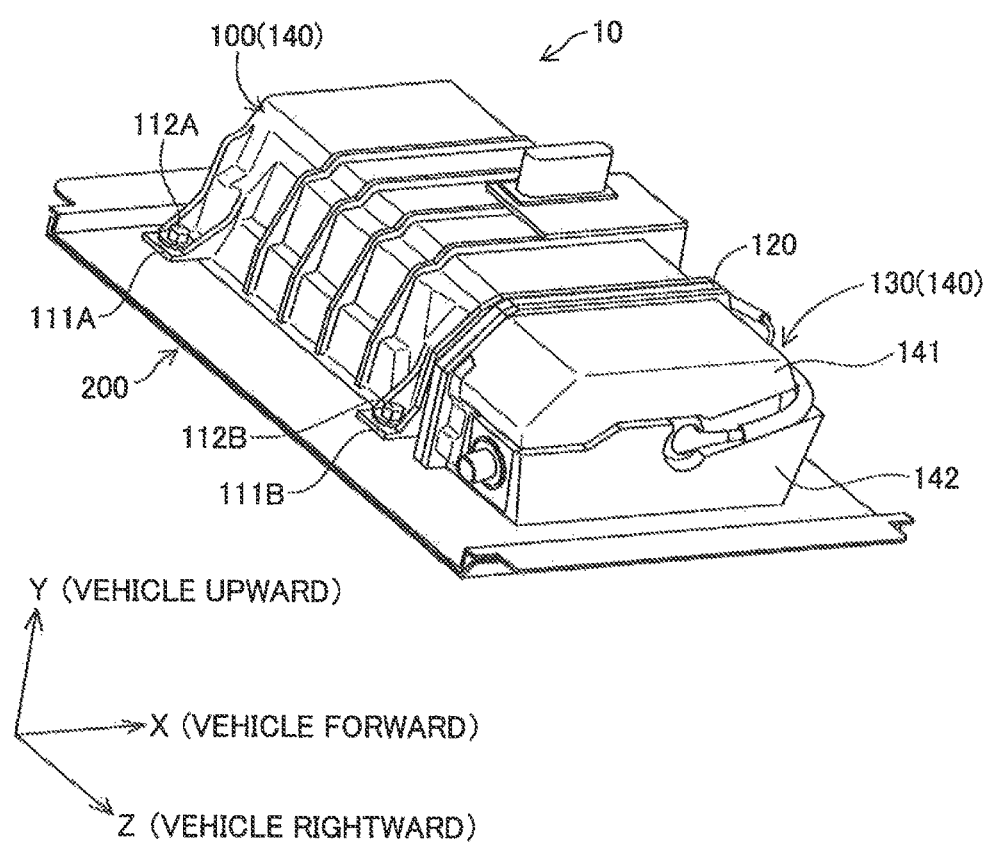
FIG. 1 is a view schematically illustrating a fuel cell system used for one embodiment of the present invention.

FIG. 1 is a view schematically illustrating a fuel cell system 10 used for one embodiment of the invention. In FIG. 1, a positive X-axis direction indicates front or forward of a vehicle, a positive Y-axis direction indicates up or upward of the vehicle, and a positive Z-axis direction indicates right or rightward of the vehicle. The fuel cell system 10 includes a fuel cell system case 140 and a frame 200. The fuel cell system 10 is mounted on the vehicle. In this embodiment, the fuel cell system 10 is provided below a vehicle cabin.

The fuel cell system case 140 includes a fuel cell case 100 and an auxiliary machinery case 130. A gasket seals between members of the fuel cell system case 140 so that foreign matters, such as water and dust, do not enter thereinto.

The fuel cell case 100 accommodates a fuel cell which causes electrochemical reactions of hydrogen gas as anode gas and oxygen gas as cathode gas. The fuel cell is comprised of unit cells which are stacked, and is oriented so that stacking directions is parallel to vehicle width directions.

The fuel cell case 100 includes manifolds 120 for covering a side face of the fuel cell on the right side of the vehicle (positive side in Z-axis directions), a stack case for covering other side faces and an upper surface, and a lower cover not illustrated) for covering a lower surface of the fuel cell. The manifolds 120 form flow paths of hydrogen gas, oxygen gas, and cooling water for cooling the fuel cell. Further, the manifolds 120 have functions to secure insulation from high-voltage components inside the fuel cell case 100, and to compress the unit cells.

Figure 2:
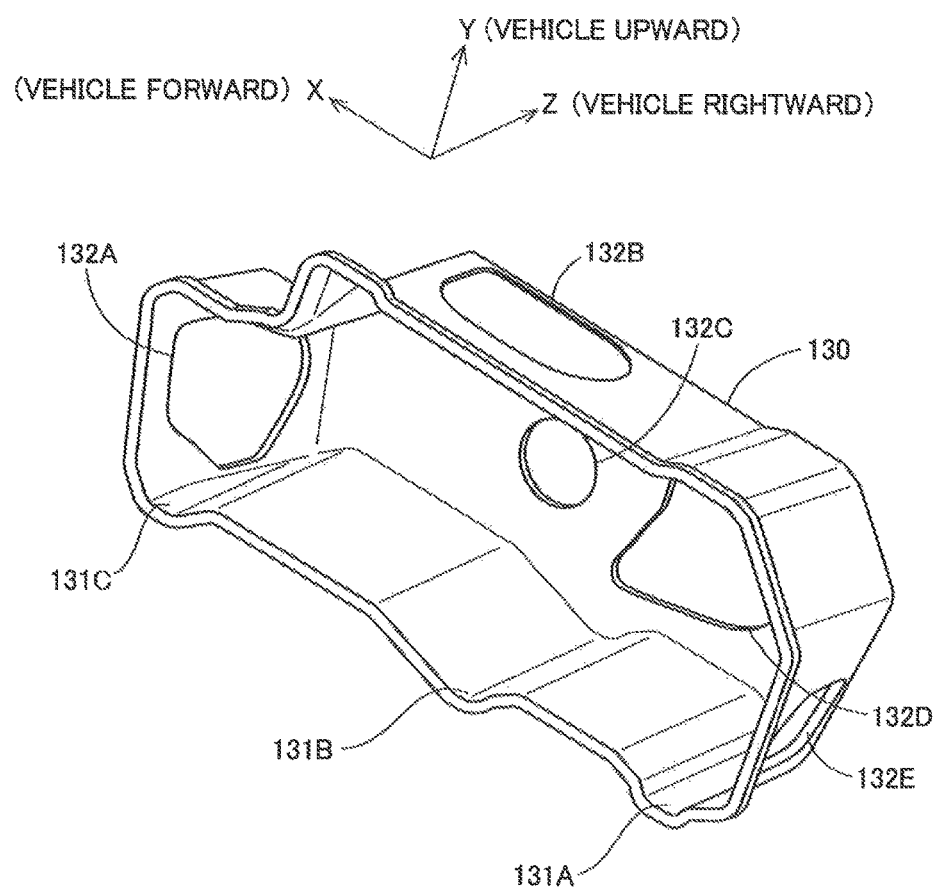
FIG. 2 is a schematic view illustrating an inside of an auxiliary machinery case.

FIG. 2 is a schematic view illustrating an inside of the auxiliary machinery case 130. X-Y-Z coordinate system in FIG. 2 corresponds to X-Y-Z coordinate system in FIG. 1. The same can also be said in other drawings.

The auxiliary machinery case 130 accommodates a plurality of auxiliary machineries (not illustrated) used for operation of the fuel cell. Here, the plurality of auxiliary machineries include, a hydrogen pump, injectors, exhaust and drain valves, valves, sensors, etc., for example. Pipings for cooling water, wirings for supplying power to the auxiliary machineries, etc. are provided to the auxiliary machinery case 130, in addition to the auxiliary machineries.

A plurality of openings 132 (132A to 132E) are formed in the auxiliary machinery case 130. The opening 132 is used as a wiring hole through which the wirings pass, a piping hole through which the pipings of gas and cooling water used for the fuel cell pass, and a service hole for a connecting work of the wirings, etc. The auxiliary machinery case 130 is provided with water reservoir portions 131A, 131B, and 131C, which will be described in detail later. In this embodiment, a plurality of auxiliary machineries are fixed to the manifolds 120. Further, a side face of the auxiliary machinery case 130 on the left side of the vehicle (negative side in Z-directions) is covered with the manifolds 120.

In order to prevent vibration and noise caused by the auxiliary machineries from transmitting to the outside, the surface of the auxiliary machinery case 130 is covered with covers 141 and 142 made of natural or synthetic resin (see FIG. 1). In this embodiment, the resin covers 141 and 142 have an inner layer made of urethane and an outer layer made of hard resin.

The frame 200 is provided below the fuel cell system case 140, and supports the fuel cell system case 140 by a vibration-proof mount structure. That is, in order to reduce the vibration, a rubber vibration insulator is disposed between the fuel cell system case 140 and the frame 200. The frame 200 fixes the fuel cell system case 140 by inserting bolts 112A and 112B into bosses 111A and 111B formed in the fuel cell case 100 of the fuel cell system case 140, respectively. Note that other bosses and bolts (not illustrated) also exist on the front side of the vehicle (positive X-axis direction). The frame 200 is fastened to a vehicle body (not illustrated).

Figure 3:
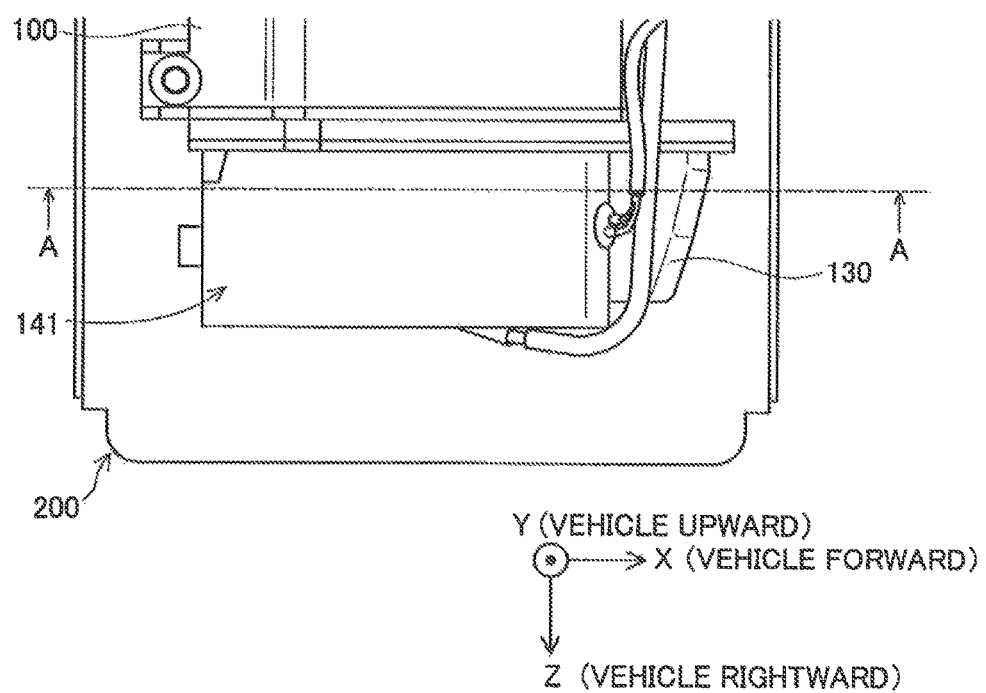
FIG. 3 is a view schematically illustrating the auxiliary machinery case of the fuel cell system, seen from above.

FIG. 3 is a view schematically illustrating the auxiliary machinery case 130 of the fuel cell system 10, seen from above the vehicle (seen from positive Y-axis direction).

FIG. 4 is a cross-sectional view illustrating the auxiliary machinery case 130 of the fuel cell system 10 taken along a line A-A of FIG. 3. Note that illustration of the auxiliary machineries is omitted in these drawings. The frame 200 is formed by welding a lower member 210 to an upper member 220. Ribs 221A and 221B are formed on an upper surface of the frame 200. In this embodiment, the ribs 221A and 221B extend in vehicle width directions (Z-axis directions). The rigidity of the frame 200 can be secured by the ribs 221.

The water reservoir portions 131 (131A to 131B) are formed inside the bottom of the auxiliary machinery case 130, which are recessed downwardly or in negative Y-axis direction, relatively to the other bottom portions. Specifically, each water reservoir portion is a concave when seen from inside the auxiliary machinery case 130, and a convex when seen from outside. The downwardly convex portions of the water reservoir portions 131A, 131B, and 131C are at least partially overlapped with the ribs 221A and 221B of the frame 200 in vertical directions (Y-axis directions). Further, the downwardly convex portions of the water reservoir portions 131A, 131B, and 131C are not overlapped with the ribs 221A and 221B of the frame 200 in horizontal directions (X-axis directions). Note that since the auxiliary machinery case 130 is fixed to the manifolds 120 with bolts, a space exists between the auxiliary machinery case 130 and the frame 200 as illustrated in FIG. 4.

Conventionally, when water reservoir portion(s) are formed in a fuel cell case, a fuel cell system entirely increases in a vertical size. On the other hand, in this embodiment, the water reservoir portions 131 are formed so that at least parts of the downwardly convex portions of the water reservoir portions 131 overlap with the ribs 221 in the vertical directions (Y-axis directions). Therefore, water can be reserved in the water reservoir portions 131, without increasing the height of the fuel cell system 10. Further, the water reservoir portions 131 are formed so that peaks of the downwardly convex portions of the water reservoir portions 131 do not overlap with the ribs 221 in the horizontal directions (X-axis directions).

Water may possibly enter into the auxiliary machinery case 130 from outside. However, in this embodiment, since the water reservoir portions 131 are formed in the bottom of the auxiliary machinery case 130, water is prevented from contacting the auxiliary machineries accommodated in the auxiliary machinery case 130.

B. Modifications

B1. Modification 1

In this embodiment, the water reservoir portions 131 are formed in the auxiliary machinery case 130. However, the present invention is not limited to this structure. The water reservoir portions 131 may be provided to the fuel cell case 100, or may be provided to both of the fuel cell case 100 and the auxiliary machinery case 130.

B2. Modification 2

The auxiliary machinery case 130 is provided with the plurality of water reservoir portions 131 in this embodiment. By having the structure, water which exists inside the auxiliary machinery case can be dividedly reserved in the plurality of water reservoir portions 131. Therefore, since water is dividedly collected in the water reservoir portions 131, the water is prevented from moving in the auxiliary machinery case 130, for example, even when the vehicle to which the fuel cell system is mounted performs a jack rabbit start, a sudden deceleration, a steep turn, etc. However, the present invention is not, limited to this structure, but may be provided with a single water reservoir portion 131.

The present invention is not limited to the embodiment and the modifications described above, and can be implemented in various structures without departing from the scope of the invention. For example, technical features in the embodiment and the modifications corresponding to technical features of each aspect cited in the section of "SUMMARY" can suitably be substituted and/or combined in order to address some or all of the subjects described above, or in order to obtain some or all of the effects described above. The technical features can suitably be deleted if the are not described as essential matters in this specification.

What is claimed is:

1. A fuel cell system, comprising:
 a fuel cell for causing electrochemical reactions of anode gas and cathode gas;
 a fuel cell case accommodating the fuel cell;
 a plurality of auxiliary machineries used for operation of the fuel cell;
 an auxiliary machinery case accommodating the plurality of auxiliary machineries, the auxiliary machinery case being distinct from the fuel cell case and separated from the fuel cell case by one or more manifolds covering a side face of the fuel cell case and a corresponding side face of the auxiliary machinery case; and
 a frame disposed below the fuel cell case and the auxiliary machinery case and fixing the fuel cell case;
 wherein a rib is provided on an upper surface of the frame,
 a water reservoir portion is provided in the bottom of the auxiliary machinery case so that the water reservoir portion is a concave in an inner side of the fuel cell system case and is a convex in the outside of the fuel cell system case,
 the water reservoir portion is located at a position at which at least a part of the convex vertically overlaps with the rib, and
 the auxiliary machinery case has a flow path of cooling water.

2. The auxiliary machine case in accordance with claim 1, wherein the water reservoir portion includes a plurality of water reservoir portions.

* * * * *